(No Model.) 3 Sheets—Sheet 1.

T. BALCOM & W. H. ALLEN, Jr.
SHOE.

No. 374,515. Patented Dec. 6, 1887.

Witnesses:
David L. Bradt.
Timothy Duggan.

Inventors:
Timothy Balcom
William H. Allen, jr.
By Thos. H. Dodge, Att'y.

(No Model.) 3 Sheets—Sheet 2.
T. BALCOM & W. H. ALLEN, Jr.
SHOE.
No. 374,515. Patented Dec. 6, 1887.
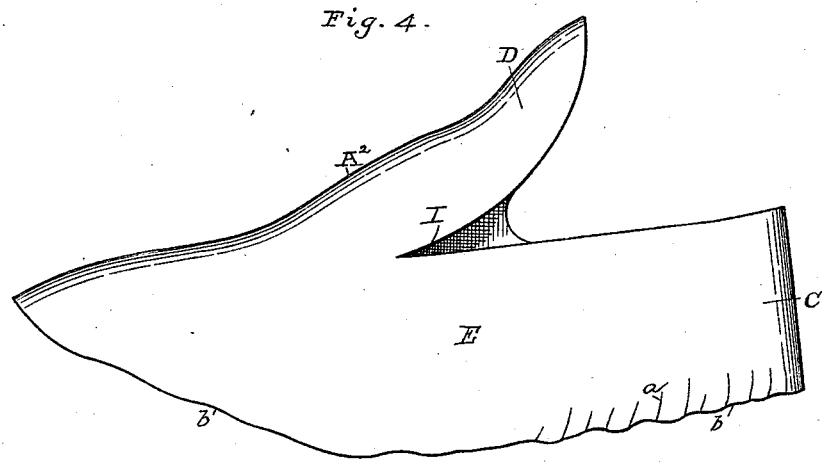
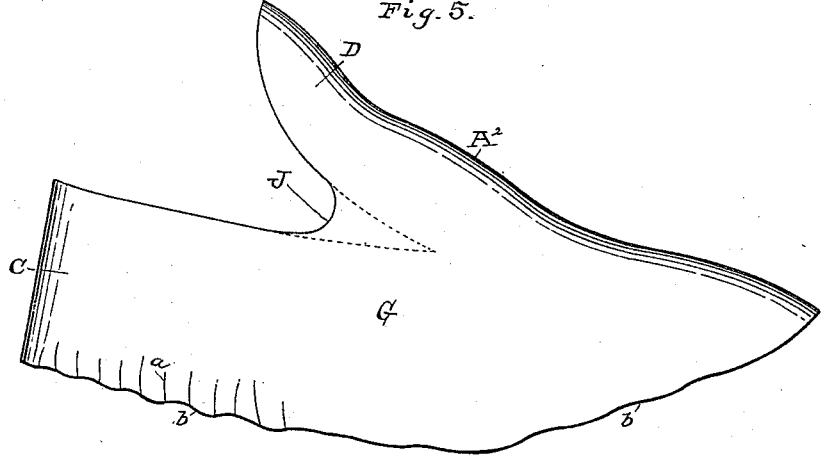
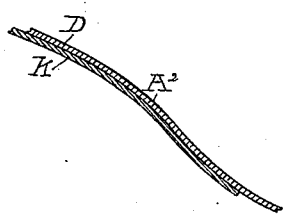
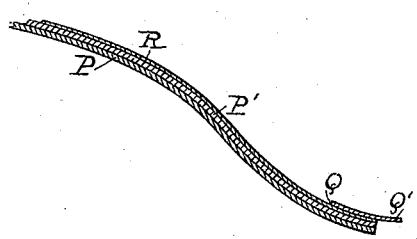

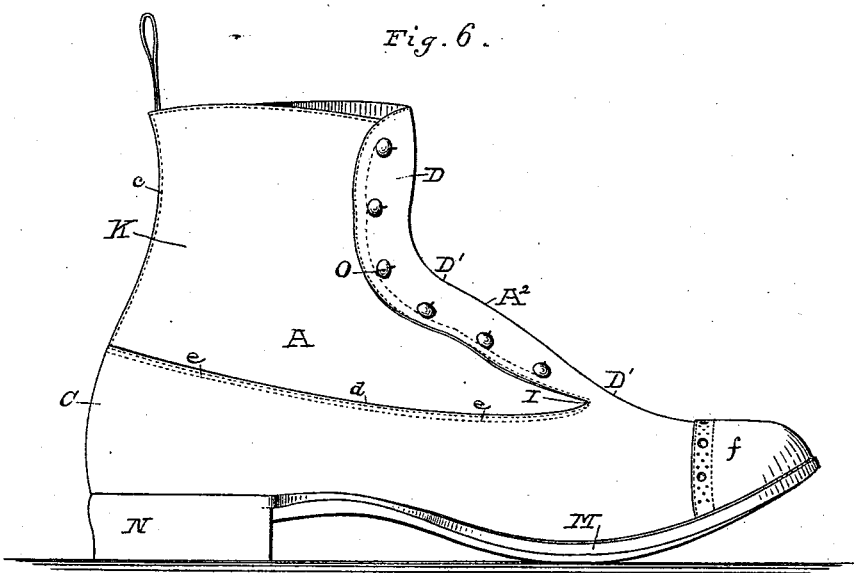
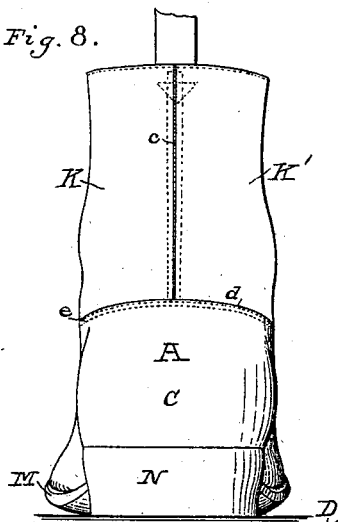
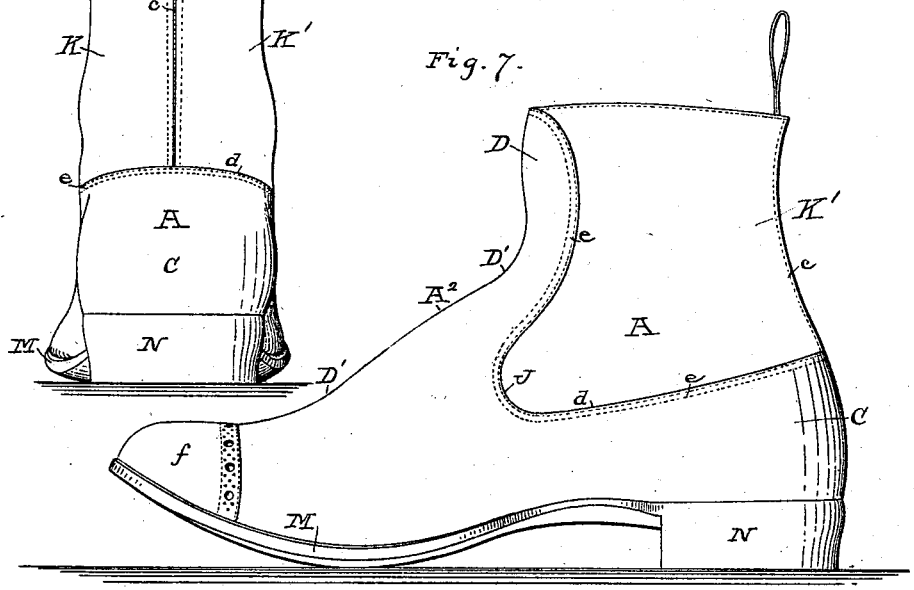

United States Patent Office.

TIMOTHY BALCOM, OF WORCESTER, AND WILLIAM H. ALLEN, JR., OF WEST BROOKFIELD, ASSIGNORS OF ONE-THIRD TO AUGUSTUS N. MAKEPEACE, OF WEST BROOKFIELD, MASSACHUSETTS.

SHOE.

SPECIFICATION forming part of Letters Patent No. 374,515, dated December 6, 1887.

Application filed October 7, 1887. Serial No. 251,765. (No model.)

*To all whom it may concern:*

Be it known that we, TIMOTHY BALCOM, of the city and county of Worcester, and Commonwealth of Massachusetts, and WILLIAM H. ALLEN, Jr., of West Brookfield, in said county, and Commonwealth of Massachusetts, have invented an Improved Button or Lap Shoe, as an improved article of manufacture; and we do hereby declare that the following is a full, clear, and exact description of the same, reference being had to the accompanying drawings, and to the letters of reference marked thereon, forming a part of this specification, and in which—

Figure 1:
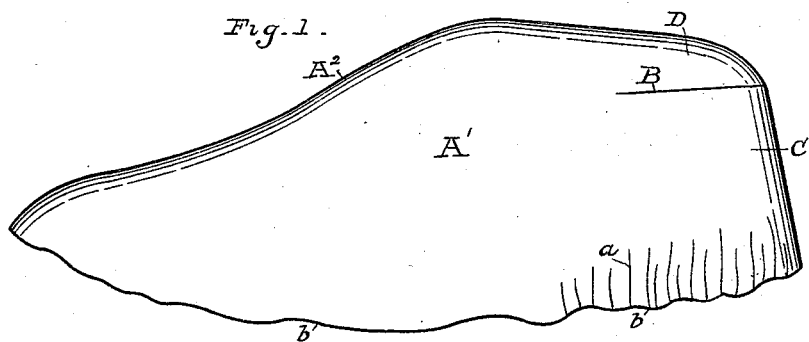
Figure 2:
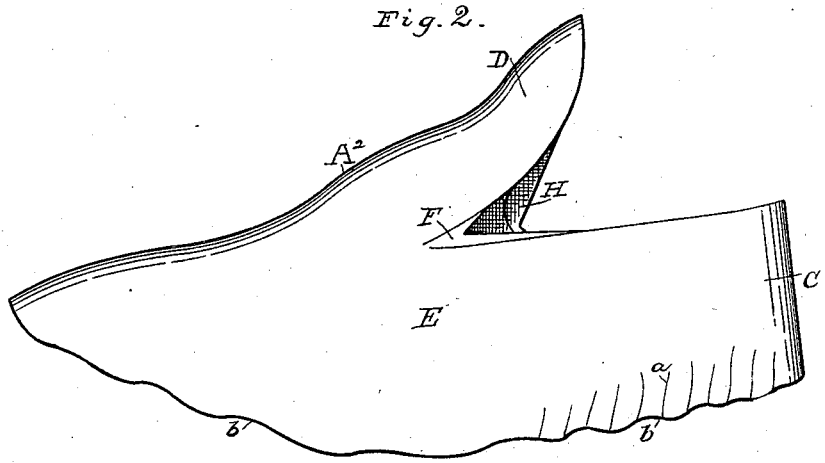
Figure 3:
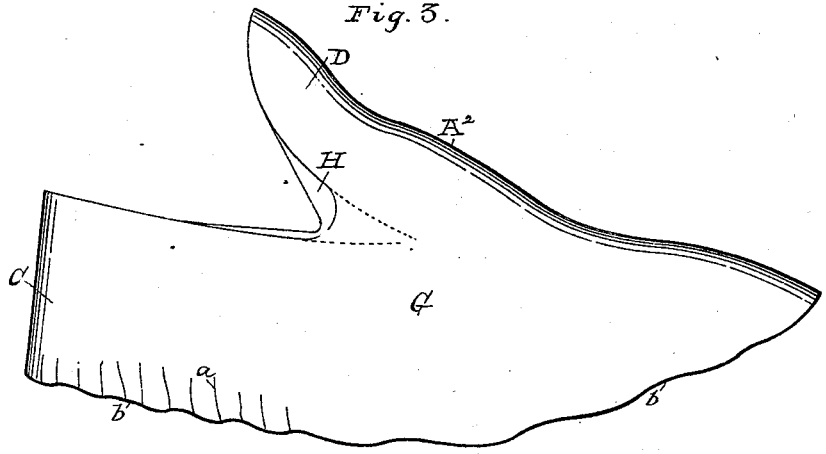

Figure 1 represents a side view of a blank-upper from which our improved button or lap shoe is made, as will be hereinafter more fully described. Fig. 2 represents a side view of the same blank-upper as it appears in the course of manufacture, as will be hereinafter more fully described. Fig. 3 represents an opposite side of the same blank shown in Fig. 2, as will be hereinafter more fully described. Fig. 4 represents the same side shown in Fig. 2 as it appears in the further course of manufacture, as will be hereinafter more fully described. Fig. 5 represents the same side view of the blank shown in Fig. 3 as it appears in the further course of manufacture, as will be hereinafter more fully described. Fig. 6 represents a view of one side of the completed shoe. Fig. 7 represents a view of the opposite side of the completed shoe to that shown in Fig. 6. Fig. 8 represents a rear view of the completed shoe. Fig. 9 represents a vertical longitudinal central section of a part of the instep of the shoe, as will be hereinafter more fully described; and Fig. 10 represents a similar section through a like part of the old button or lap shoe upon which ours is an improvement, as will be hereinafter more fully described.

To enable those skilled in the art to which our invention relates to make and use the same, we will now describe the invention more in detail.

In the drawings, A is the completed shoe, and A' is the seamless blank from which our shoe is made, the same having been first pressed into the form shown in Fig. 1 from a single piece of leather, the lines *a* indicating the crimps made in the operation of pressing and forming the blank A'. As blank A' is pressed out of a single piece of leather, the center portion, especially the instep part $A^2$ is expanded very much, and to such an extent that it is "set," and therefore when the shoe is worn the instep part of the shoe fits the instep of the foot in an easy manner, and, besides, the peculiar and great pressure exerted on the instep part $A^2$ in forming the blank A' expands and stretches the fibers to such an extent that no subsequent shrinking of the leather will cause the instep to bind. In making the shoe the fitter first makes a cut, B, in from the heel end of the blank, after which the blank is placed on a form combining a foot and ankle, and over this form the blank is drawn, the fitter pulling down the edge *b* all around the form and working the upper down by rubbing and pulling, thereby forcing the heel part C back and the lap part D up and forward, as shown in Fig. 2. The fitter then cuts out of the side E the small pointed piece F, (indicated in full lines, Fig. 2, and dotted lines, Fig. 3,) and also cuts out of side G the rounded piece H, (shown in full lines, Figs. 2 and 3,) and after which recutting the side E will appear as shown in full lines, Fig. 4, while side G will appear as shown in full lines, Fig. 5, the shape of the respective cuts or openings I and J between the sides E and G and the lap-piece D being clearly shown in Figs. 4 and 5 of the drawings. It may be here observed that the blank A' is by preference pressed with the wrong side out, and is not generally turned until after the recutting and fitting has been attended to, as above described. The blank is now ready to receive the ankle side pieces, K K', which are closed at the back by seam *c* and stitched to one side of the lap-piece D and to the upper edge, *d*, of the blank A' by a seam, *e*, all as clearly indicated in the drawings, Figs. 6, 7, and 8, after which the upper is lasted, and sole M and heel N applied in the usual manner, trimmed, rubbed down, and the bottom smoothed off carefully, when it is complete, as shoe A, Figs. 6, 7, and 8.

If preferred, for ornament or otherwise, a toe-cap, f, may be applied in the usual manner, and, in lieu of the buttons O and their respective button-holes in the lap-piece D, short straps and buckles may be used for heavy shoes.

From the foregoing description it will be seen that our improved shoe does not have a front seam above the instep, as in the common lap or button shoe; neither does it have side or back vertical seams, since the sides E and G and heel part C and lap part D are all made from a single piece of upper-leather. In our improved shoe, therefore, there are no objectionable side, back, and top seams to rip and get out of repair.

The shoe is easier to the foot in walking than the old button or lap shoe, since the sides bend to conform to the motions of the foot and ankle freer than if stiff side seams were employed. The heel, too, is easier and a better fit is obtained than when it has a seam, as in the common lap or button shoe, from the heel N up to the seam e. Still, again, the instep C is also very easy and comfortable, because the leather is well stretched into the desired form and set at the line D', while the lap part D is more pliable and yielding to the ankle and foot than the old style, there being no seam in front and only two thicknesses of leather over the top of the foot or instep part—viz., D and K—and this lap part is a little to one side, as shown in Fig. 6, whereas in the old or common style of lap or button shoe there are four thicknesses of leather, since the ankle side pieces, P P', corresponding to the pieces K K' in our shoe, are stitched together in front and both extend down under the edge Q of the upper Q', to which they are also stitched, as is the brace or seam cover R, thereby giving a stiff action to the shoe, which is very trying and uncomfortable to the wearer, all of which objections are obviated by our invention, while at the same time great saving is made both in the labor of making and material used. As before shown, only very small pieces of leather are cut out from the blank A' in fitting the blank for the last, and the pieces of leather can be so cut from carefully-prepared patterns that but little trimming is necessary on the edge b in lasting to receive the sole M and heel N, while, as before indicated, the entire upper is subjected to great pressure in the preparation of the blank A' for use in the manufacture of this shoe, and as a consequence the piece of leather is so enlarged that our shoes can be made from much less leather than by the old modes in use prior to our invention.

What we claim as our invention, and desire to secure by Letters Patent as an improved article of manufacture, is—

A lap or button shoe, A, the sides E and G, heel part C, and lap part D, pressed and formed from a single piece of leather, as hereinbefore described, with upper, side, or ankle pieces, K K', fitted to and stitched thereon and to each other, all substantially as shown and described.

TIMOTHY BALCOM.
WILLIAM H. ALLEN, JR.

Witnesses:
DAVID L. BRADT,
THOS. H. DODGE.